Aug. 2, 1955     C. R. HIRSCHBERGER     2,714,375
TAPPET VALVE OPERATING MECHANISM

Filed Sept. 4, 1952     3 Sheets-Sheet 1

INVENTOR
CARL R. HIRSCHBERGER

BY *H. W. Helvestine*
*George Sipkin*
ATTORNEYS

Aug. 2, 1955

C. R. HIRSCHBERGER 2,714,375

TAPPET VALVE OPERATING MECHANISM

Filed Sept. 4, 1952

INVENTOR
CARL R. HIRSCHBERGER

BY
ATTORNEYS

Aug. 2, 1955  C. R. HIRSCHBERGER  2,714,375
TAPPET VALVE OPERATING MECHANISM
Filed Sept. 4, 1952  3 Sheets-Sheet 3

INVENTOR
CARL R. HIRSCHBERGER
BY
ATTORNEYS

United States Patent Office 2,714,375
Patented Aug. 2, 1955

2,714,375

TAPPET VALVE OPERATING MECHANISM

Carl R. Hirschberger, United States Navy

Application September 4, 1952, Serial No. 307,946

6 Claims. (Cl. 123—90)

(Granted under Title 35, U. S. Code (1952), sec. 266)

The invention described herein may be manufactured and used by or for the Government of the United States of America for governmental purposes without the payment of any royalties thereon or therefor.

This invention relates to tappet valve operating mechanisms, and more particularly to a valve tappet mechanism including a rotation-inducing device for slowly rotating the associated valve during operation of the mechanism.

A tappet valve operating mechanism generally comprises a valve seat, a valve having a valve head and a stem, and operating means for periodically reciprocating the valve for cyclically arising the valve head from and lowering it back tightly on the valve seat. The operating means usually comprises a rotatable cam and a cam follower which acts on the valve stem for the raising operation and a compressible valve spring pressing on a valve spring washer associated with the valve stem for the lowering operation. The lowering energy of the valve spring is determined by the compression imparted to it by the force of the cam during the raising operation and by whatever compression is stored in it during assembly. The washer on which the valve spring presses generally is associated with the valve stem through a retaining or locking means comprising a bore portion on the washer and a retaining means (more commonly known as keepers) on a valve stem. In a known form of tappet valve operating mechanism, the washer and the valve stem are periodically disengaged through the action of the cam follower so that periodically limited relative movement can take place between the washer and the valve stem. In the common form of tappet valve operating mechanism, however, the washer and stem are always in engagement.

During operation, the parts of the operating mechanism are necessarily exposed to heat and wear which may adversely affect their effectiveness and life. Additionally, foreign deposits, such as carbon, on the valve or on the valve seat interfere with valve seating and reduce engine efficiency. Accordingly, in practice, it is frequently necessary to carry out extensive and expensive maintenance procedures on an engine in order to keep up its efficiency.

Metallurgical advances have been made in the materials used for the parts of tappet valve operating mechanisms which increase their heat-resistance and life. Also efforts have been made to provide a device that can be added to such mechanisms for automatically rotating their valves during engine-operation so as to provide improved valve-seating, keep the valves free in their guides, and otherwise improve valve-action and the satisfactory operating-life of the engine before an overhaul. A type of such a valve-rotating mechanism is disclosed in a paper by A. T. Colwell, entitled "Corrosion-Resistant Metals for Valves and Seats on Heavy-Duty Engines," published on pages 94–103 of the January 1948 Society of Automotive Engineers Quarterly Transactions. However this valve-rotating mechanism consists of a plurality of small moving parts subject to breakage as well as wear, including numerous small coil springs and balls, and a complicated form of washer, incorporating a series of inclined grooves, difficult to manufacture.

The principal object of the present invention is to provide a tappet valve operating mechanism which insures continued valve effectiveness, thereby extending the length of the operating periods of internal combustion engines between overhauls made necessary by loss of valve sealing efficiency.

Another principal object of the present invention is to provide a tappet valve operating mechanism provided with automatic valve-rotating means which is highly effective, but nevertheless is extremely simple, durable and inexpensive as compared to prior valve-rotating mechanisms.

A further object of the invention is to provide an automatic valve-rotating means that can be easily and inexpensively added to conventional valve tappet mechanisms.

An important object of the invention is to provide valve-rotating means using the conventional designs of valve tappet mechanisms, the valve-rotating means, however, comprising novel and simple energy-receiving and force-exerting resilient means positively and directly secured to the mechanism, and constructed and arranged so as to function satisfactorily through long and continued use and in such a manner that its operation will not be adversely affected by wear that might occur in the valve-rotating means.

In accordance with a preferred form of the invention, a force for rotating the valve stem originates in a resilient connection between the valve and its operating means. This connection preferably comprises the conventional valve-spring washer of the valve tappet mechanism, and certain means attached thereto. In a specific mode of the invention, this means comprises resilient legs on the side of the washer away from the valve spring and in such position as to be engaged by the cam follower of the operating means in a manner tending to flex the legs, thus creating a rotative force. This force operates to cause rotation of the valve. Specifically, the leg means comprise a number of legs, each having one end attached to the underside of the washer and the rest of the leg extending downward and across the washer. In effect, a cantilever arrangement results in having a far or free end in a position to be engaged by the cam follower. When such engagement takes place each leg flexes, changing its effective length, and thus creates the rotative force. Accordingly, it is a further and more specific object of this invention to provide a conventional valve-spring washer having a number of valve-rotating legs, the legs being so positioned as to be engaged and disengaged with an operating part of the conventional valve-stem lifting mechanism. In another mode of the invention, valve-rotation is effected through flexing that occurs primarily in the washer itself. For convenience and brevity a washer constructed to cause rotation of a tappet valve is hereinafter called a rotator-washer.

Objects, features and innovations of the invention, in addition to the foregoing, will be discernible from the following description of preferred embodiments thereof. The description is to be taken in conjunction with the accompanying drawings in which.

Figure 1:
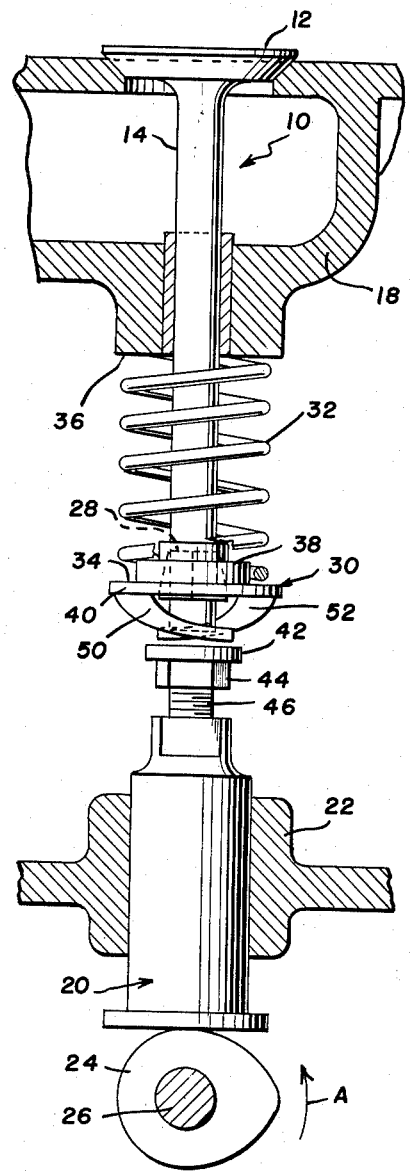
Fig. 1 is a vertical view, partly in cross-section, of a tappet valve assembly embodying the invention, the tappet valve being shown in seated position.
Figure 2:
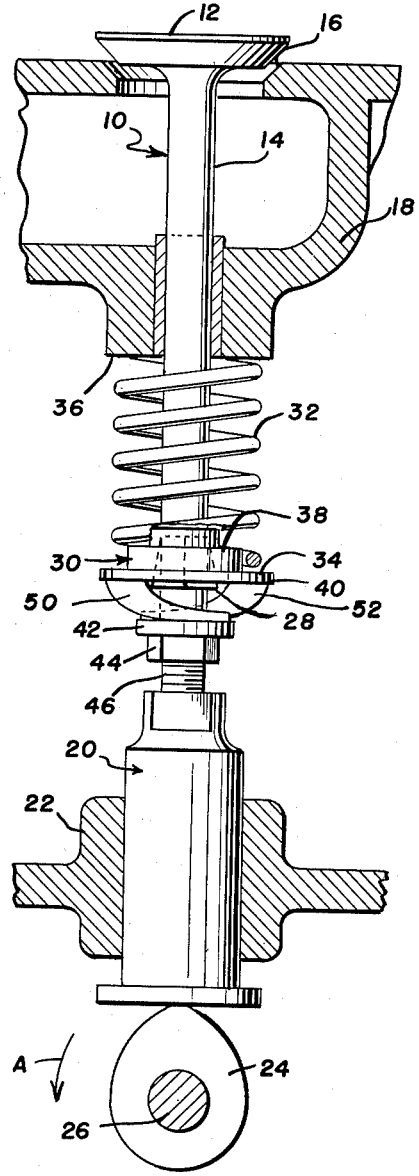
Fig. 2 is a view similar to that of Fig. 1 with the tappet valve in lifted or unseated position.
Figure 3:
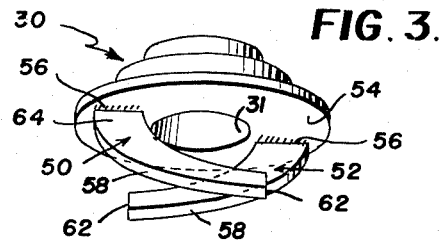
Fig. 3 is an enlarged perspective view of the rotator-washer used in Figs. 1 and 2.
Figure 4:
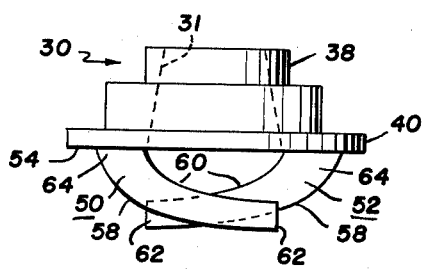
Figure 6:
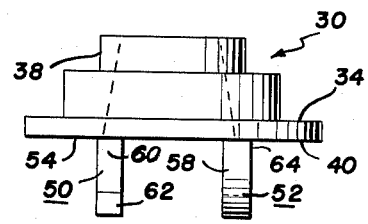
Figure 5:
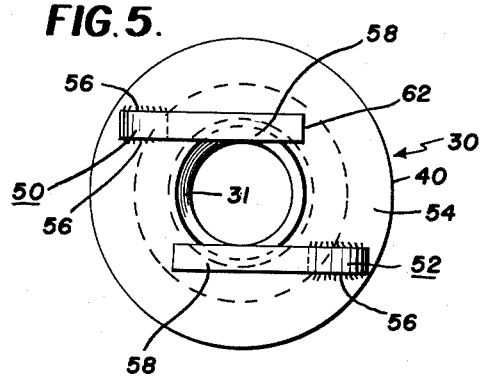
Figure 7:
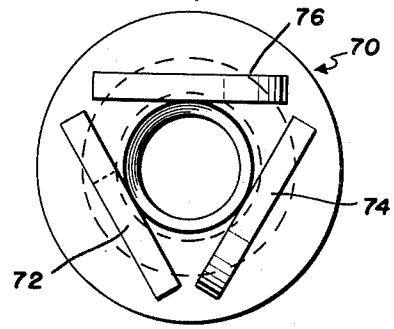
Figure 8:
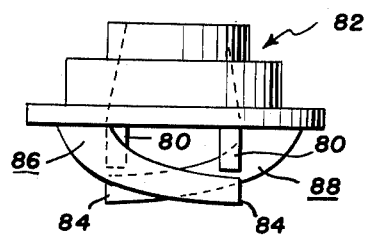
Figure 9:
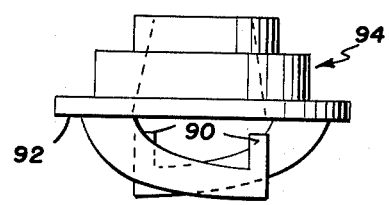
Figure 10:
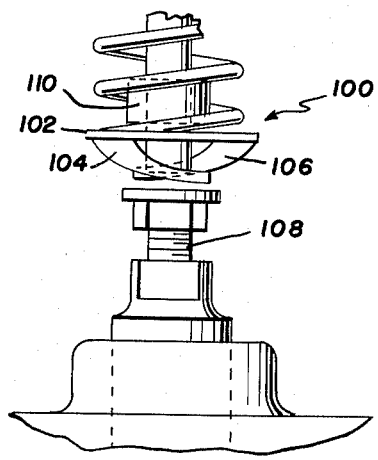
Figure 11:
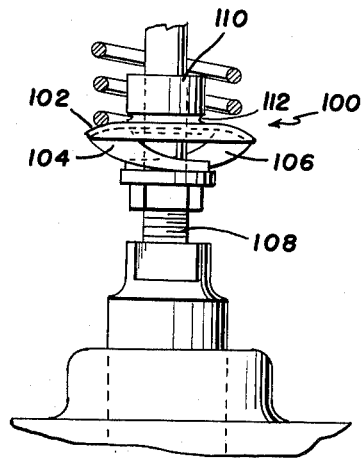
Figure 12:
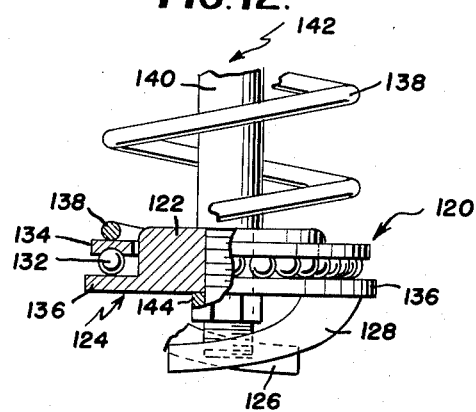
Figure 13:
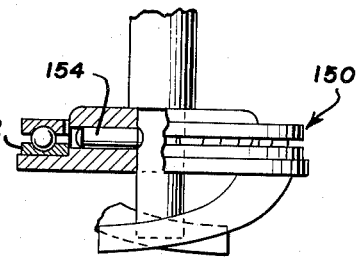

Figs. 4, 5, and 6 are, respectively, scaled side, bottom, and end views, of a tested rotator-washer such as shown in Figs. 1 and 2, the washer having an actual outside diameter of about 1⅛ inches;

Fig. 7 is a bottom view of a modified form of rotator-washer;

Fig. 8 is a side view of another modified form of rotator-washer;

Fig. 9 is a side view of still another modified form of rotator-washer;

Figs. 10 and 11 are partial vertical views of a tappet valve assembly, similar to Figs. 1 and 2, but showing another modified form of rotator-washer in which rigid legs are secured to a resilient washer; and Figs. 12 and 13 are fragmentary views of a valve tappet mechanism, in elevation and partly in section, of additional modifications.

This invention is applicable to all tappet valve machinery, such as for example, internal combustion engines, compressors, etc., that depend for effectiveness upon the action of tappet valves which are controlled, in part at least, by reciprocating cam mechanisms, including hydraulic valve lifters. However, for illustrative purposes, the invention is described in connection with a conventional combustion engine which is represented in the drawings by a one-piece valve 10 having a valve head 12 and a valve stem 14, a valve seat 16, a block or engine portion 18 of the combustion engine, a cam follower 20, a bearing guide 22 for the cam follower, a cam 24, a rotatable shaft 26 for the cam 24, tapered keepers 28 on the valve stem 14 in relatively fixed relation with respect thereto, a valve-spring washer 30 having a tapered hole or bore 31 for engaging the keepers 28, and a compression-type valve spring 32 having one end bearing against but not attached to a face 34 of the washer 30 and its other end bearing against but not attached to a spring ledge 36 of the engine portion 18.

The washer 30 comprises a cap portion 38 which is any suitable shape providing the bore 31, and is fittable on the keepers 28 and into the valve spring 32. The washer also comprises a flat, annular base or flange portion 40, the upper surface of which forms the face 34.

The keepers 28 usually comprise a plurality of separate segments or parts that are assembled into single or multiple grooves on the valve stem 14, and are shaped to seat in the bore 31.

The cam follower 20 comprises a head consisting of a head-plate 42, nut 44 and an adjustable threaded shank 46, which may also receive a lock nut, for clearance or lash adjustment.

As is known in the art, the specific parts above set forth can be replaced with other equivalent parts. For example, the tapered keepers can be replaced with a key, split washer or a pin in which case the valve spring washer could have a straight-sided central hole or bore.

The above described conventional equipment, lacking a valve-rotating means in accordance with the present invention, operates in a manner well known to the art. If it be assumed that nothing is interposed between the valve stem 14 and the head-plate 42 of the cam follower 20, then upon rotation of the cam 24 of Fig. 1 in the direction of the arrow A, the head-plate 42 would first be lifted into engagement with the bottom of the valve stem 14. Thereafter continued rotation of the cam 24 would raise the cam follower 20 and the head-plate 42 which in turn would raise the valve 10 so that valve head 12 would be lifted from its seat 16. The rising valve stem 14 would also act through keepers 28 to raise the washer 30 against the force of spring 32 which would therefore be further compressed until the valve 10 reaches its maximum raised open position. This raised position of the valve is shown in Fig. 2. Under the assumption that nothing is interposed between the valve stem 14 and the head-plate 42 of the cam follower 20, the lowering operation would be substantially the reverse of the raising operation. Upon rotation of the cam into the lowering position the downwardly acting force of the compressed valve spring 32 would be transmitted through the washer 30 and keepers 28 to the valve stem 14. Because of such action of the spring 32 and because of the weight of the valve 10, the valve would press downward on the surface of the head-plate 42 of the cam follower 20 which in turn would drop as it follows the surface of the rotating cam 24, and the valve 10 would close during this lowering operation. Continuous rotation of the cam under the condition assumed would cause the raising and lowering action periodically to repeat.

In accordance with teachings of the invention, a simplified resilient means is provided for rotating the valve by the reciprocating forces involved. In a preferred embodiment, this means specifically is associated with the valve-spring washer 30 so that the washer becomes a rotator-washer. In the specific embodiment shown in Figs. 1–6, the resilient means comprises a pair of members 50 and 52 of a resilient metal, preferably a steel, rigidly secured to the underneath face 54 of the rotator-washer 30, preferably by welding 56. In the preferred embodiment, the members 50 and 52 correspond in shape, each having curved surfaces 58 and 60 that flare from a narrow free end or toe 62 of the member to the heel end 64 so as to provide, in effect, a cantilever-like arrangement of the members on the rotator-washer. For convenience, the members can be identified by any known label such as, for example, lugs, arms or legs. For the sake of uniform nomenclature they are called legs. The legs 50 and 52 are arranged in parallel on opposite sides of the axis of the rotator-washer 30, and hence of the axis of the valve-stem 14. Preferably they are radially equidistant from the axis, being symmetrically placed but facing in the same general rotatory or angular direction; for example, the free end or toe 62 of the leg 50 extends to the right with respect to Fig. 4, whereas the toe 62 of the leg 52 on the opposite side of the washer-axis extends to the left. The legs are secured to marginal portions of the rotator-washer 30, being circumferentially spaced therealong.

The legs 50 and 52 are so shaped that their lowermost surfaces, that is, their surfaces vertically farthest from the lower face 54 of the rotator-washer, are near or at the narrow toe ends 62 of the legs. In closed position of the valve 10, as shown in Fig. 1, these surfaces are slightly below the bottom of the valve stem 14. The legs can be considered to extend downward from the face 54, and inward of the rotator-washer from the welds 56. In closed position of the valve 10 as shown in Fig. 1, the leg members 50 and 52 are unflexed with free end portions of their surfaces 58 substantially parallel to the plane of plate 42 of the cam follower 20; the plate 42 of the cam follower 20 is under and separated from the legs 50 and 52 and the valve stem 14; and the valve spring 32 presses down on the face 34 of rotator-washer 30, thereby forcing the washer down on the keepers 28 which in turn transmit the downward force to the valve stem 14, resulting in the valve head 12 being firmly seated in the valve seat 16.

It has been found by actual full-scale test of equipment embodying the invention as described and shown in Figs. 1 through 6, that continuous rotation of a cam similar to cam 20 for repeatedly raising and lowering a valve similar to valve 10 is accompanied by a slow rotation of the valve in a single direction about its own longitudinal axis. With a valve-operating mechanism including a rotator-washer as shown in Figs. 4–6 installed in a popular make (Chrysler) automobile engine block having a cam shaft driven at 863 revolutions per minute, a valve of the engine rotated steadily, making one complete revolution with respect to its valve seat every fifteen seconds. The direction of rotation corresponded to that which would wind the valve spring at its lower end. In other words, with the legs 50 and 52 extending in a direction such as shown in Figs. 1 and 2, and with the valve spring wound as shown therein, clockwise rotation of the valve as viewed from above was produced.

In the operation of the embodiment described, it is believed that as the cam 24 rotates counter-clockwise from the position shown in Fig. 1, it raises the cam follower 20. When the head-plate 42 of the cam follower first engages the free ends of the legs 50 and 52, it forces them upward against the resisting force of the valve spring 32 that is acting downward on the rotator-washer 30 and hence on the heel ends 64 of the legs 50 and 52. The increasing upward force on the free ends 62 of the legs 50 and 52, arising from the increasing raising force of the cam follower, and the resisting downward force on the heel ends 64 of the leg members, causes the leg members 50 and 52 to flex or deflect in a manner tending to bring their free ends 62 closer to the annular base 40 of the rotator-washer 30, as represented in Fig. 2. This distortion or flexure of the legs creates a restoring force in them; and it also seems that there is an increase in the effective lengths of the legs from their securing points at the face 54 to the contact points on head-plate 42. Apparently, this action, including this so-called "lengthening" of the opposed legs 50 and 52, that occurs on opposite sides of the headplate 42, results in a torque or rotative impulse between the cam follower 20 and the rotator-washer 30 tending to produce relative rotation between them with respect to a vertical axis coinciding with their common axis. The extent of such rotation will depend upon the relative mass moments of inertia of the rotatable parts.

It is believed that a minute rotation of the valve 10 occurs during the beginning of the raising operation while the legs 50 and 52 are flexing and the valve stem 14 is in intimate frictional engagement with, that is clutched or engaged to, the rotator-washer 30 through the keepers 28. It is also believed that subsequently, at some time during the transfer of the full load of the valve spring 32 from the valve 10 to the legs 50 and 52, the rotator-washer 30 and its keepers 28 on the valve stem 14 become frictionally disengaged or separated to a sufficient extent to permit limited relative movement between the rotator-washer and the valve stem. In other words the bore portion 31 of the rotator-washer 30 and the keepers 28 on the valve stem 14 form a separable connection, or engageable and disengageable clutch, for the operating means of the valve. It is believed that a slight separation, in effect, occurs between the rotator-washer 30 and the keepers 28 after the valve stem 14 has made its rotatory movement and while the rotator-washer is continuing to move vertically upward under the action of the cam-force transmitted through legs 50 and 52. It is also believed that any rotational distortion of the valve spring 32 due to forced relative rotation of the rotator-washer 30 with respect to the cam follower 20 is dissipated back through the rotator-washer during the period when the rotator-washer is separated from the keepers 28. This reverse rotation of the rotator-washer is not imparted to the valve because at this time the rotator-washer is declutched from, that is, not in intimate frictional engagement with, the keepers 28 and valve stem 14.

In the lowering action of the cam 24 for closing the valve 10, the compressed valve spring 32, acting through rotator-washer 30 and legs 50 and 52, forces the cam follower 20 downward in its guide 22 against the cam. At the same time, the rotator-washer 30 re-engages keepers 28 so that the valve re-assumes the load of the valve spring. The legs 50 and 52 being relieved of the load, regain their unflexed position as the cam follower continues to drop and separates from the legs 50 and 52, and are ready for again imparting a rotative impulse to the valve upon the next raising action of the cam. It is to be noted that the legs 50 and 52 are in engagement with plate 42 during most of the valve raising and lowering operations. Obviously, the legs must be of substantial construction to carry the full force of the valve spring 32 reacting against the raising action of the cam 20.

It may be that rotation of a valve with the rotator-washer occurs in cooperation with the inherent limited rotation of the lower end of the valve spring concomitant with its reciprocation, and the tendency of the cam follower to rotate because of the tapered surface of the cams of the conventional engine. However, during a full-scale test, steady valve rotation was obtained with the substitution of a gum rubber block having no rotative tendency in place of the valve spring, and also with a cam follower that was prevented from turning by a wrench.

The embodiment shown in Figs. 4–6 corresponds to that hereinbefore described which during a test produced one rotation of the valve about its vertical axis every fifteen seconds. In the tested rotator-washer, the legs were spaced less than the maximum diameter of the tapered bore at the base of the rotator-washer. For such a construction, two conventional keepers were sawed in half to facilitate assembly. However, the spacing between legs can be changed. A change in leg-spacing will affect the speed of valve-rotation; and in the specific construction, an increased spacing apparently will produce a slower turning of the valve.

Fig. 2 shows the deflection of the legs 50 and 52 exaggerated. In the specific test previously described, the rotator-washer was such that a 25 pound force on each of the legs flexed them axially, that is, a vertical distance, of approximately two one-thousandths of an inch. However, the invention is not limited to the exact embodiment tested, or to the speeds and deflections mentioned by way of illustration, since the design and characteristics of the resilient means obviously can be changed.

Fig. 7 shows a modified form of rotator-washer 70 having three flex legs 72, 74, and 76 symmetrically arranged around the underneath side of the rotator-washer.

In the event that it is desired to use more flexible legs, or material of low endurance limit, or to positively limit the deflection of the legs, stops can be provided in any suitable manner, as shown for example in Figs. 8 and 9. In Fig. 8, depending lugs 80 on the bottom side of the flat portion of a rotator-washer 82 are immediately above but spaced a slight distance from the toe portions 84 of legs 86 and 88 of the rotator-washer. In Fig. 9, the legs themselves are provided with vertical extensions 90 that extend almost up to the bottom face 92 of the rotator-washer 94.

In the embodiments of Figs. 1–9, the legs are the flexing resilient members. Consequently, the flat annular portions of the rotator-washers should be relatively stiff as compared to the legs so that the deflection takes place in the legs. Figs. 10 and 11 show a modification in which a rotator-washer 100 has a flat annular flange portion 102 that has less stiffness than the legs 104 and 106. In operation, the portion 102 bends or deflects while the legs preferably remain rigid. Fig. 11 shows such a washer with the deflection of the portion 102 exaggerated. Note that the rim of the portion 102 bows concave downward during the raising action of the cam follower lifting means 108. For improved flexing of the annular portion 102, the upper cap 110 of the rotator-washer 100 is preferably formed with an inward groove 112 at its bottom.

In order to permit relative rotation between the rotator-washer and the valve spring in an embodiment having the rotator-washer fixed to the valve stem, a thrust bearing can be incorporated between the valve spring and the upper face of the base flange portion of the rotator-washer. An embodiment of this kind is shown in Fig. 12 wherein a conventional thrust ball-bearing 120 is placed around a cap 122 of rotator-washer 124 having legs 126 and 128. The thrust bearing comprises balls 132 and an upper race 134. The balls 132 rest on the base flange 136 of the rotator-washer 124 and the valve spring 138 rests on the upper race 134.

In the form of the invention shown in Fig. 12, the rotator-washer is fixed to the valve. The bore of the rotator-washer 124 is threaded to engage the reduced-diameter threaded lower end of the valve stem 140 of a valve 142. Lock nut 144 threaded on the lower end of the valve stem 140 preferably locks the rotator-washer 124 to the valve stem 140.

Balls 132 permit the unit comprising valve 142 and rotator-washer 124, and the valve spring 138 freely to rotate relative to each other. In Fig. 12, the legs 126 and 128 are so positioned as to impart counter-clockwise rotation to the valve 142 as viewed from above. In a test of an embodiment such as shown in Fig. 12, turning of a valve at the rate of one rotation each seven seconds was obtained with an automobile engine block as described in connection with Figs. 4–6.

Fig. 13 illustrates another means for securing the rotator-washer to the valve stem in an embodiment including a thrust bearing 150, such as that of Fig. 12 but having a lower race 152. A pin 154 secures and positions the rotator-washer on the valve stem.

It is also apparent that a cam follower can be provided with flexing legs for cooperation with a conventional unmodified valve spring washer.

In any event, it is to be noted that the rotator-washer and the flex legs of the embodiments shown together form a single member having a resilient portion that is flexed by operation of the cam follower. This unitary or one-piece resilient member is all that is required for effecting the principles of the invention in its simplified form.

It is to be noted that Figs. 12 and 13 disclose the use of thrust washers but in conjunction with a rotator-washer which is fixed to the valve stem. Obviously the engageable and disengageable clutch connection, such as described in connection with Figs. 1 and 2, can be used instead of the fixed connection.

It should be understood, of course, that the foregoing description relates only to preferred embodiments of the invention, but the disclosure is intended to cover all changes and modifications of the examples of the invention herein chosen for the purposes of description, which do not constitute departures from the spirit and scope of the invention as set forth in the appended claims.

This application is a continuation of application Serial No. 232,440 filed June 19, 1951.

What is claimed is:

1. A rotator for a valve stem comprising a rigid base member having a downwardly disposed face adapted to be positioned in a plane substantially normal to the longitudinal axis of said stem; a bore portion in said base member adapted to engage said stem; and a resilient leg having an end fixed to an outer marginal portion of said face; said leg extending away from said face and toward another marginal portion of said base member.

2. A rotator for a valve stem comprising a rigid base member having a downwardly disposed face adapted to be positioned in a plane substantially normal to the longitudinal axis of said stem; said base member having a bore for engaging said stem; and a pair of opposed resilient legs having one end only fixed to opposite outer marginal portions of said face; said legs being flared and extending in opposite directions in parallel planes on opposite sides of the axis of said bore.

3. A rotator for a valve stem comprising a rigid base member having a face adapted to be positioned in a plane substantially normal to the longitudinal axis of said stem; a bore portion in said base member adapted to engage said stem; and a resilient leg having an end fixed to an off-center portion of said face; said leg extending away from said face and toward another off-center portion of said base member.

4. A rotator for a valve stem comprising a rigid base member having a face adapted to be positioned in a plane substantially normal to the longitudinal axis of said stem; said base member having a bore for engaging said stem; and a pair of opposed resilient legs each having one end only fixed to an off-center portion of said face, said offset portions being in opposition; said legs being flared and extending in opposite directions in parallel planes on opposite sides of the axis of said bore.

5. A rotator for a valve stem comprising a rigid base member having a face adapted to be positioned in a plane substantially normal to the longitudinal axis of said stem; a bore portion in said base member adapted to engage said stem; and multiple resilient legs each having an end fixed to an off-center portion of said face; each leg extending away from said face and toward another off-center portion of said base member.

6. A rotator for a tappet valve assembly having, a valve, a valve stem and an axis, a lifting element for lifting the valve, a peripheral element on said valve stem, and a connection between said peripheral element and stem; said rotator comprising a resilient centilever interposed between the elements through which the force of the lifting element is transmitted to the peripheral element, the free end of said cantilever extending to one side of a plane including the valve axis and the center of the cantilever root, said cantilever root being rigid.

References Cited in the file of this patent

UNITED STATES PATENTS

| | | |
|---|---|---|
| 1,005,897 | Shields et al. | Oct. 17, 1911 |
| 2,165,239 | Douglas et al. | July 11, 1939 |
| 2,225,265 | Fitts | Dec. 17, 1940 |
| 2,653,587 | Rasmussen et al. | Sept. 29, 1953 |